United States Patent
Han et al.

(10) Patent No.: US 10,523,122 B2
(45) Date of Patent: Dec. 31, 2019

(54) POWER SUPPLY APPARATUS AND DISPLAY APPARATUS INCLUDING THE SAME

(71) Applicant: LG DISPLAY CO., LTD., Seoul (KR)

(72) Inventors: JaeWon Han, Paju-si (KR); JungJae Kim, Paju-si (KR); HyungJin Choe, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 16/226,462

(22) Filed: Dec. 19, 2018

(65) Prior Publication Data
US 2019/0222123 A1 Jul. 18, 2019

(30) Foreign Application Priority Data
Dec. 29, 2017 (KR) ................ 10-2017-0184869

(51) Int. Cl.
*H02M 1/36* (2007.01)
*H02M 3/158* (2006.01)
*G02F 1/1333* (2006.01)
*H02M 1/08* (2006.01)
*G09G 3/00* (2006.01)

(52) U.S. Cl.
CPC ........ *H02M 3/1582* (2013.01); *G02F 1/1333* (2013.01); *G09G 3/00* (2013.01); *H02M 1/08* (2013.01); *H02M 1/36* (2013.01)

(58) Field of Classification Search
CPC .......... H02M 1/08; H02M 1/36; H02M 3/156; H02M 3/158; H02M 3/1582; G02F 1/133; G02F 1/1333
See application file for complete search history.

(56) References Cited

U.S. PATENT DOCUMENTS

| | | | | |
|---|---|---|---|---|
| 7,542,020 B2* | 6/2009 | Jeong | ..................... | G09G 3/296 345/204 |
| 8,194,013 B2* | 6/2012 | Choi | .................... | G09G 3/3283 345/690 |
| 2010/0079432 A1* | 4/2010 | Kang | ....................... | G09G 5/00 345/211 |
| 2013/0169655 A1* | 7/2013 | Rha | ......................... | G06F 12/00 345/531 |
| 2015/0123639 A1 | 5/2015 | Jang | | |
| 2017/0111536 A1* | 4/2017 | Kawai | ................ | H04N 1/00129 |
| 2017/0171612 A1* | 6/2017 | Liu | .................... | H04N 21/4436 |

FOREIGN PATENT DOCUMENTS

KR 101446929 B1 10/2014

* cited by examiner

Primary Examiner — Matthew V Nguyen
(74) Attorney, Agent, or Firm — Polsinelli PC (57) ABSTRACT

Disclosed are a power supply apparatus and a display apparatus including the same, which control a plurality of slave power supply apparatuses without any increase in number of terminals of a master power supply circuit. The power supply apparatus includes a master power supply circuit, a slave power supply circuit, and an enable signal line connected between the master power supply circuit and the slave power supply circuit. A voltage of the enable signal line is shifted based on an operation of the slave power supply circuit.

18 Claims, 4 Drawing Sheets

POWER SUPPLY APPARATUS AND DISPLAY APPARATUS INCLUDING THE SAME

CROSS REFERENCE TO RELATED APPLICATION

This application claims the benefit of the Korean Patent Application No. 10-2017-0184869 filed on Dec. 29, 2017, which is hereby incorporated by reference as if fully set forth herein.

BACKGROUND

Field of the Disclosure

The present disclosure relates to a power supply apparatus and a display apparatus including the same.

Description of the Background

Generally, power supply apparatuses rectify an alternating current (AC) voltage to convert the AC voltage into a direct current (DC) voltage, or steps up/down the AC voltage to a desired voltage, thereby supplying the DC voltage needed for various devices (for example, display apparatuses, light emitting diodes (LEDs), etc.).

A power supply apparatus connected to a display apparatus generates and outputs, by using a plurality of power supply circuits, various voltages (for example, a plurality of different logic voltages, a gate-on voltage for turning on a thin film transistor (TFT), a gate-off voltage for turning off the TFT, etc.) needed for displaying an image on a display panel.

Recently, as an additional voltage is needed based on a driving manner of a display panel, an additionally needed voltage may be supplied by connecting a power supply apparatus to at least one auxiliary power supply circuit capable of outputting the additional voltage, rather than newly designing the power supply apparatus. In this case, the power supply apparatus may act as a master power supply apparatus, and the auxiliary power supply circuit may be defined as a slave power supply apparatus subordinate to the master power supply apparatus.

A power sequence control circuit of a related art master power supply apparatus supplies an enable signal to a corresponding slave power supply apparatus, based on a predetermined power sequence and receives a normal operation notification signal supplied from the slave power supply apparatus to check and control an operation start state of the slave power supply apparatus. Therefore, two terminals (or pins) are needed for controlling and checking operations and operation states of a master power supply apparatus and a slave power supply apparatus, and thus, as the number of slave power supply apparatuses connected to the master power supply apparatus, the number of terminals of the master power supply apparatus increases.

Moreover, in a case where the master power supply apparatus supplies only the enable signal to a corresponding slave power supply apparatus, the number of terminals of the master power supply apparatus may decrease. However, since the master power supply apparatus cannot check operation states of a plurality of slave power supply apparatuses, the plurality of slave power supply apparatuses may be driven in a state which is against a power sequence.

Information disclosed in this Background section was already known to the inventors of the inventive concept before achieving the present disclosure or is technical information acquired in the process of achieving the present disclosure. Therefore, it may contain information that does not form the prior art that is already known to the public in this country.

SUMMARY

Accordingly, the present disclosure is directed to providing a power supply apparatus and a display apparatus including the same that substantially obviate one or more problems due to limitations and disadvantages of the related art.

An aspect of the present disclosure is directed to providing a power supply apparatus and a display apparatus including the same, which control a plurality of slave power supply apparatuses without any increase in number of terminals of a master power supply circuit.

Additional advantages and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these and other advantages and in accordance with the purpose of the disclosure, as embodied and broadly described herein, there is provided a power supply apparatus including a master power supply circuit, a slave power supply circuit, and an enable signal line connected between the master power supply circuit and the slave power supply circuit, wherein a voltage of the enable signal line is shifted based on an operation of the slave power supply circuit.

The voltage of the enable signal line may be maintained at a first voltage level according to an enable signal supplied from the master power supply circuit, or may be shifted to a second voltage level which differs from the first voltage level, based on an incorrect operation of the first slave power supply circuit.

In another aspect of the present disclosure, there is provided a display apparatus including a display panel including a pixel provided in a pixel area defined by intersection of a gate line and a data line, a panel driver supplying a gate signal to the gate line and supplying a data voltage to the data line, and a power supply unit converting an input voltage into a direct current (DC) voltage and supplying the DC voltage to at least one of the display panel and the panel driver, wherein the power supply unit includes a master power supply circuit, a slave power supply circuit, and an enable signal line connected between the master power supply circuit and the slave power supply circuit, and wherein a voltage of the enable signal line is shifted based on an operation of the slave power supply circuit.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate aspects of the disclosure and together with the description serve to explain the principle of the disclosure.

In the drawings.

DETAILED DESCRIPTION OF THE DISCLOSURE

Reference will now be made in detail to the exemplary aspects of the present disclosure, examples of which are illustrated in the accompanying drawings. Wherever possible, the same reference numbers will be used throughout the drawings to refer to the same or like parts.

Advantages and features of the present disclosure, and implementation methods thereof will be clarified through following aspects described with reference to the accompanying drawings. The present disclosure may, however, be embodied in different forms and should not be construed as limited to the aspects set forth herein. Rather, these aspects are provided so that this disclosure will be thorough and complete, and will fully convey the scope of the present disclosure to those skilled in the art. Furthermore, the present disclosure is only defined by scopes of claims.

A shape, a size, a ratio, an angle, and a number disclosed in the drawings for describing aspects of the present disclosure are merely an example, and thus, the present disclosure is not limited to the illustrated details. Like reference numerals refer to like elements throughout. In the following description, when the detailed description of the relevant known technology is determined to unnecessarily obscure the important point of the present disclosure, the detailed description will be omitted.

In a case where 'comprise', 'have', and 'include' described in the present specification are used, another part may be added unless 'only~' is used. The terms of a singular form may include plural forms unless referred to the contrary.

In construing an element, the element is construed as including an error range although there is no explicit description.

In describing a position relationship, for example, when a position relation between two parts is described as 'on~', 'over~', 'under~', and 'next~', one or more other parts may be disposed between the two parts unless 'just' or 'direct' is used.

In describing a time relationship, for example, when the temporal order is described as 'after', 'subsequent', 'next~', and 'before~', a case which is not continuous may be included unless 'just' or 'direct' is used.

It will be understood that, although the terms "first", "second", etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item.

Features of various aspects of the present disclosure may be partially or overall coupled to or combined with each other, and may be variously inter-operated with each other and driven technically as those skilled in the art can sufficiently understand. The aspects of the present disclosure may be carried out independently from each other, or may be carried out together in co-dependent relationship.

Hereinafter, aspects of a power supply apparatus and a display apparatus including the same according to the present disclosure will be described in detail with reference to the accompanying drawings. In adding reference numerals to elements of each of the drawings, although the same elements are illustrated in other drawings, like reference numerals may refer to like elements. In the following description, when the detailed description of the relevant known function or configuration is determined to unnecessarily obscure the important point of the present disclosure, the detailed description will be omitted.

Figure 1:
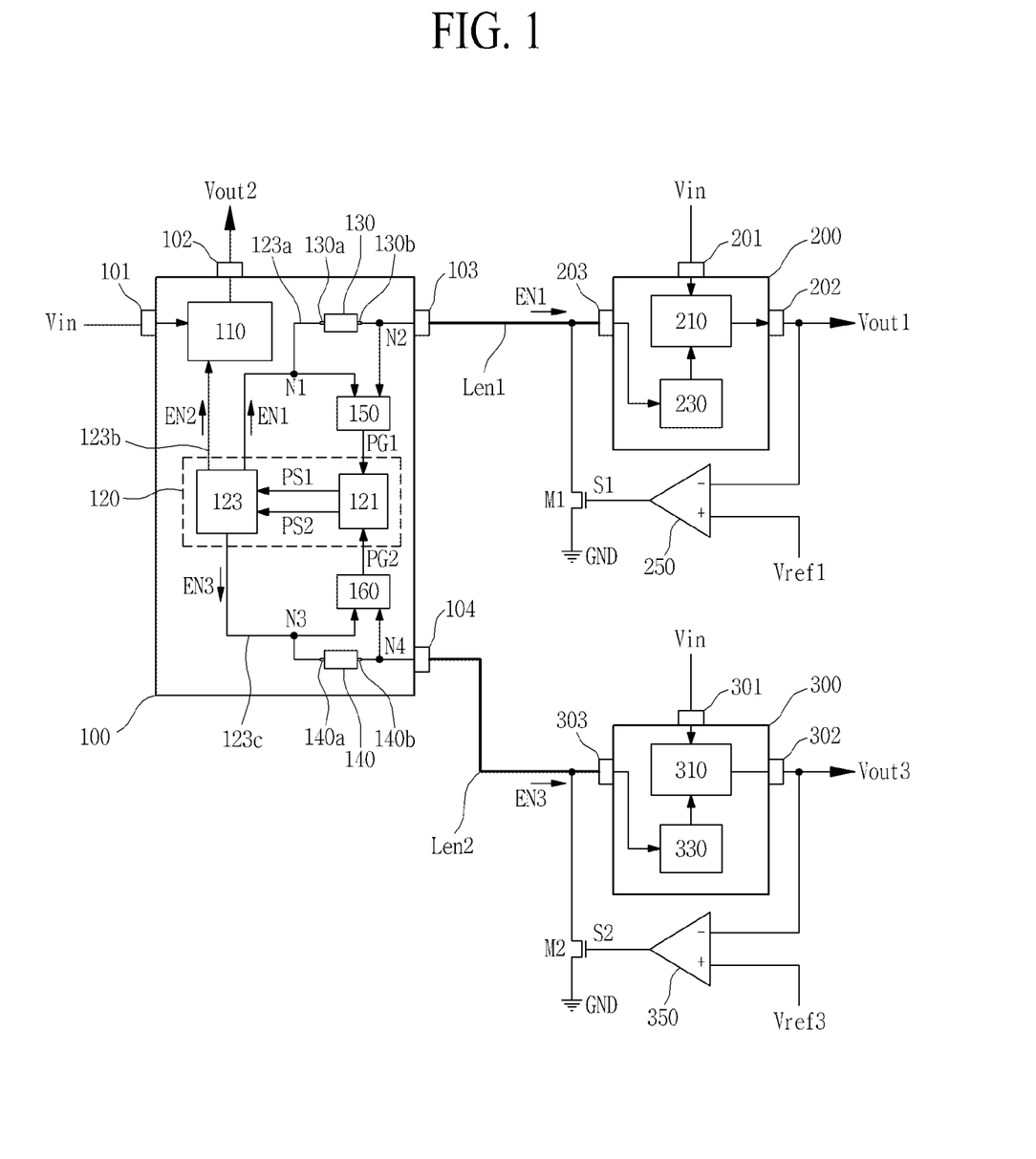
FIG. 1 is a diagram illustrating a power supply apparatus according to an aspect of the present disclosure.

FIG. 1 is a diagram illustrating a power supply apparatus according to an aspect of the present disclosure.

Referring to FIG. 1, the power supply apparatus according to an aspect of the present disclosure may include a master power supply circuit 100, a first slave power supply circuit 200, a second slave power supply circuit 300, a first enable signal line Len1, and a second enable signal line Len2. Here, the master power supply circuit 100, the first slave power supply circuit 200, the second slave power supply circuit 300, the first enable signal line Len1, and the second enable signal line Len2 may be mounted on a printed circuit board (PCB) (or a control board).

The master power supply circuit 100 may control an operation of each of the first slave power supply circuit 200 and the second slave power supply circuit 300 and may output a second direct current (DC) voltage Vout2, based on an input voltage Vin.

The master power supply circuit 100 according to an aspect may include a power terminal 101 connected to the input voltage Vin, an output terminal 102 for outputting the second DC voltage Vout2, a first control terminal 103 for outputting a first enable signal EN1, and a second control terminal 104 for outputting a third enable signal EN3. Also, the master power supply circuit 100 according to an aspect may include a voltage conversion circuit 110, a master control circuit 120, a first buffer circuit 130, a second buffer circuit 140, a first operation sensing circuit 150, and a second operation sensing circuit 160. The master power supply circuit 100 may be a master power management integrated circuit (IC) or a master power management chip.

The voltage conversion circuit 110 may start to operate according to a second enable signal EN2 supplied from the master control circuit 120 and may convert the input voltage Vin, input through the power terminal 101, into the second DC voltage Vout2 to output the second DC voltage Vout2 through the output terminal 102. The voltage conversion circuit 110 according to an aspect may be configured with a DC-DC converter (for example, a buck converter (or a step-down converter) or a boost converter (or a step-up converter), based on a voltage level of the input voltage Vin and a level of the second DC voltage Vout2.

The master control circuit 120 may generate the first to third enable signals EN1 to EN3, based on a predetermined power sequence. The master control circuit 120 may control an operation of the first slave power supply circuit 200 according to the first enable signal EN1, control an operation of the voltage conversion circuit 110 according to the second enable signal EN2, and control an operation of the second slave power supply circuit 300 according to the third enable signal EN3. The first enable signal EN1 may be supplied to the first slave power supply circuit 200 through a first enable signal output line 123a, the first control terminal 103, and the first enable signal line Len1. The second enable signal EN2 may be supplied to the voltage conversion circuit 110 through a second enable signal output line 123b. Also, the third enable signal EN3 may be supplied to the second slave power supply circuit 300 through a third enable signal output line 123c, the second control terminal 104, and the second enable signal line Len2. Here, the first to third enable signals EN1 to EN3 may be sequentially generated based on the power sequence, but are not limited thereto. In other aspects, the first to third enable signals EN1 to EN3 may be generated based on a connection sequence between the master power supply circuit 100 and the first and second slave power supply circuits 200 and 300.

Moreover, the master control circuit 120 may vary the first enable signal EN1 according to a first slave operation signal PG1 supplied from the first operation sensing circuit 150 and may vary the third enable signal EN3 according to a second slave operation signal PG2 supplied from the second operation sensing circuit 160.

The master control circuit 120 according to an aspect may include a protection circuit 121 and a power sequence control circuit 123.

The protection circuit 121 may generate a first power cutoff signal PS1 according to the first slave operation signal PG1 supplied from the first operation sensing circuit 150 and may generate a second power cutoff signal PS2 according to the second slave operation signal PG2 supplied from the second operation sensing circuit 160. For example, the protection circuit 121 may generate the first power cutoff signal PS1 having a first logic state according to the first slave operation signal PG1 having the first logic state supplied from the first operation sensing circuit 150 and may generate the first power cutoff signal PS1 having a second logic state according to the first slave operation signal PG1 having the second logic state supplied from the first operation sensing circuit 150. Also, the protection circuit 121 may generate the second power cutoff signal PS2 having the first logic state according to the second slave operation signal PG2 having the first logic state supplied from the second operation sensing circuit 160 and may generate the second power cutoff signal PS2 having the second logic state according to the second slave operation signal PG2 having the second logic state supplied from the second operation sensing circuit 160.

The power sequence control circuit 123 may generate the first to third enable signals EN1 to EN3 having different timings, based on the predetermined power sequence. For example, the power sequence control circuit 123 may sequentially generate the first to third enable signals EN1 to EN3 having the first logic stage (or a high logic state) for starting an operation of each of the voltage conversion circuit 110, the first slave power supply circuit 200, and the second slave power supply circuit 300, based on the predetermined power sequence. For example, the power sequence control circuit 123 may output, to the first control terminal 103, the first enable signal EN1 having the first logic state for starting (or controlling) an operation of the first slave power supply circuit 200, start (or control) an operation of the voltage conversion circuit 110 according to the second enable signal EN2 having the first logic state, and may output, to the second control terminal 104, the third enable signal EN3 having the first logic state for starting (or controlling) an operation of the second slave power supply circuit 300.

Moreover, the power sequence control circuit 123 may vary the first to third enable signals EN1 to EN3 according to the first and second power cutoff signals PG1 and PG2 supplied from the protection circuit 121. For example, when at least one of the first power cutoff signal PS1 having the second logic state and the second power cutoff signal PS2 having the second logic state is supplied from the protection circuit 121, the power sequence control circuit 123 may vary each of the first to third enable signals EN1 to EN3 to the second logic state (or a low logic state), thereby stopping (or shutting down) an operation of each of the voltage conversion circuit 110 and the first and second slave power supply circuits 200 and 300.

The first buffer circuit 130 may buffer the first enable signal EN1 supplied from the master control circuit 120 to the first control terminal 103 to supply a buffered first enable signal EN1 to the first control terminal 103. That is, the first buffer circuit 130 may include a first terminal 130a connected to the first enable signal output line 123a of the master control circuit 120 and a second terminal 130b connected to the first control terminal 103. The first buffer circuit 130 may be connected between the first enable signal output line 123a of the master control circuit 120 and the first control terminal 103 to separate a load between the first enable signal output line 123a of the master control circuit 120 and the first control terminal 103 and may buffer the first enable signal EN1 supplied from the master control circuit 120 to supply a buffered first enable signal EN1 to the first control terminal 103. The first buffer circuit 130 according to an aspect may be an inverter type buffer and may include an even number of inverters connected serially between the first enable signal output line 123a of the master control circuit 120 and the first control terminal 103.

The second buffer circuit 140 may buffer the third enable signal EN3 supplied from the master control circuit 120 to the second control terminal 104 to supply a buffered third enable signal EN3 to the second control terminal 104. That is, the second buffer circuit 140 may include a first terminal 140a connected to the third enable signal output line 123c of the master control circuit 120 and a second terminal 140b connected to the second control terminal 104. The second buffer circuit 140 may be connected between the third enable signal output line 123c of the master control circuit 120 and the second control terminal 104 to separate a load between the third enable signal output line 123c of the master control circuit 120 and the second control terminal 104 and may buffer the third enable signal EN3 supplied from the master control circuit 120 to supply a buffered third enable signal EN3 to the second control terminal 104. The second buffer circuit 140 according to an aspect may be an inverter type buffer and may include an even number of inverters connected serially between the third enable signal output line 123c of the master control circuit 120 and the second control terminal 104.

The first operation sensing circuit 150 may generate the first slave operation signal PG1, based on the first enable signal EN1 supplied from the first buffer circuit 130 and a voltage of the first control terminal 103. The first operation sensing circuit 150 according to an aspect may receive a voltage of the first enable signal EN1 as a first input voltage through a first node N1 between the first enable signal output line 123a of the master control circuit 120 and the first terminal 130a of the first buffer circuit 130, receive the voltage of the first control terminal 103 as a second input voltage through a second node N2 between the second terminal 130b of the first buffer circuit 130 and the first control terminal 103, perform a logic operation on the first input voltage and the second input voltage to generate the first slave operation signal PG1 having the first logic state or the second logic state. For example, the first operation sensing circuit 150 may be an exclusive OR (XOR) gate, but may be another logic operation gate without being limited thereto.

The second operation sensing circuit 160 may generate the second slave operation signal PG2, based on the third enable signal EN3 supplied from the second buffer circuit 140 and a voltage of the second control terminal 104. The second operation sensing circuit 160 according to an aspect may receive a voltage of the third enable signal EN3 as a first input voltage through a third node N3 between the third enable signal output line 123c of the master control circuit 120 and the first terminal 140a of the second buffer circuit 140, receive the voltage of the second control terminal 104 as a second input voltage through a fourth node N4 between the second terminal 140b of the second buffer circuit 140 and the second control terminal 104, perform a logic operation on the first input voltage and the second input voltage to generate the second slave operation signal PG2 having the first logic state or the second logic state. For example, the second operation sensing circuit 160 may be an XOR gate, but may be another logic operation gate without being limited thereto.

The first slave power supply circuit 200 may be connected to the master power supply circuit 100 through the first enable signal line Len1, may start to operate based on the first enable signal EN1 supplied through the first enable signal line Len1, and may output a first DC voltage Vout1, based on the input voltage Vin.

The first slave power supply circuit 200 according to an aspect may include a power terminal 201 connected to the input voltage Vin, an output terminal 202 for outputting the first DC voltage Vout1, and an enable input terminal 203 for receiving the first enable signal EN1. Also, the first slave power supply circuit 200 according to an aspect may include a first voltage conversion unit 210 and a first control unit 230. The first slave power supply circuit 200 may be a slave power management IC or a slave power management chip.

The first voltage conversion unit 210 may convert the input voltage Vin, input through the power terminal 201, into the first DC voltage Vout1 and may output the first DC voltage Vout1 to the output terminal 202. The first voltage conversion unit 210 according to an aspect may be configured with a DC-DC converter (for example, a buck converter (or a step-down converter) or a boost converter (or a step-up converter), based on a voltage level of the input voltage Vin and a level of the first DC voltage Vout1.

The first control unit 230 may start (or control) an operation of the first voltage conversion unit 210 according to the first enable signal EN1 having the first logic state which is input through the first enable signal line Len1 and the enable input terminal 203 from the master power supply circuit 100. Also, the first control unit 230 may receive a voltage level of the first DC voltage Vout1 which is output to the output terminal 202 and is fed back thereto, and may control an operation of the first voltage conversion unit 210, thereby allowing the first voltage conversion unit 210 to output the first DC voltage Vout1 which is constant.

The second slave power supply circuit 300 may be connected to the master power supply circuit 100 through the second enable signal line Len2, may start to operate based on the third enable signal EN3 supplied through the second enable signal line Len2, and may output a third DC voltage Vout3, based on the input voltage Vin.

The second slave power supply circuit 300 according to an aspect may include a power terminal 301 connected to the input voltage Vin, an output terminal 302 for outputting the third DC voltage Vout3, and an enable input terminal 303 for receiving the third enable signal EN3. Also, the second slave power supply circuit 300 according to an aspect may include a second voltage conversion unit 310 and a second control unit 330. The second slave power supply circuit 300 may be a slave power management IC or a slave power management chip.

The second voltage conversion unit 310 may convert the input voltage Vin, input through the power terminal 301, into the third DC voltage Vout3 and may output the third DC voltage Vout3 to the output terminal 302. The second voltage conversion unit 310 according to an aspect may be configured with a DC-DC converter (for example, a buck converter (or a step-down converter) or a boost converter (or a step-up converter), based on a voltage level of the input voltage Vin and a level of the third DC voltage Vout3.

The second control unit 330 may start (or control) an operation of the second voltage conversion unit 310 according to the second enable signal EN2 having the first logic state which is input through the second enable signal line Len2 and the enable input terminal 303 from the master power supply circuit 100. Also, the second control unit 330 may receive a voltage level of the third DC voltage Vout3 which is output to the output terminal 302 and is fed back thereto, and may control an operation of the second voltage conversion unit 310, thereby allowing the second voltage conversion unit 310 to output the third DC voltage Vout3 which is constant.

The first enable signal line Len1 may be electrically connected to the first control terminal 103 of the master power supply circuit 100 and the enable input terminal 203 of the first slave power supply circuit 200 and may transfer the first enable signal EN1, output from the first control terminal 103 of the master power supply circuit 100, to the enable input terminal 203 of the first slave power supply circuit 200. A voltage of the first enable signal line Len1 may be shifted based on an operation of the first slave power supply circuit 200. For example, the voltage of the first enable signal line Len1 may be maintained at a first voltage level according to the first enable signal EN1 supplied from the master power supply circuit 100, or may be shifted to a second voltage level different from the first voltage level due to a non-output of a voltage or an incorrect operation caused by an internal or external cause of the first slave power supply circuit 200. Here, the first voltage level may correspond to the first logic state, and the second voltage level may correspond to the second logic state. However, the present aspect is not limited thereto.

The second enable signal line Len2 may be electrically connected to the second control terminal 104 of the master power supply circuit 100 and the enable input terminal 303 of the second slave power supply circuit 300 and may transfer the third enable signal EN3, output from the second control terminal 104 of the master power supply circuit 100, to the enable input terminal 303 of the second slave power supply circuit 300. A voltage of the second enable signal line Len2 may be shifted based on an operation of the second slave power supply circuit 300. For example, the voltage of the second enable signal line Len2 may be maintained at the first voltage level according to the third enable signal EN3 supplied from the master power supply circuit 100, or may be shifted to the second voltage level different from the first voltage level due to a non-output of a voltage or an incorrect operation caused by an internal or external cause of the second slave power supply circuit 300. Here, the first voltage level may correspond to the first logic state, and the second voltage level may correspond to the second logic state. However, the present aspect is not limited thereto.

The power supply apparatus according to an aspect of the present disclosure may include a first switching element M1, a second switching element M2, a first switching control circuit 250, and a second switching control circuit 350.

The first switching element M1 may be mounted on a PCB adjacent to the first slave power supply circuit 200, connected between the first enable signal line Len1 and a ground voltage GND, and turned on according to a first switching control signal S1. For example, the first switching element M1 may be turned on according to the first switching control signal S1 having the first logic state and may electrically connect the first enable signal line Len1 to the ground voltage GND to shift a voltage of the first enable signal line Len1 to the second voltage level based on the ground voltage GND. On the other hand, the first switching element M1 may be turned off according to the first switching control signal S1 having the second logic state and may allow the voltage of the first enable signal line Len1 to be maintained at the first voltage level.

The first switching element M1 according to an aspect may include a gate terminal for receiving the first switching control signal S1, a first source/drain terminal connected to the first enable signal line Len1, and a second source/drain terminal connected to the ground voltage GND. Here, each of the first and second source/drain terminals of the first switching element M1 may be defined as a source terminal or a drain terminal, based on a direction of a current.

The second switching element M2 may be mounted on a PCB adjacent to the second slave power supply circuit 300, connected between the second enable signal line Len2 and the ground voltage GND, and turned on according to a second switching control signal S2. For example, the second switching element M2 may be turned on according to the second switching control signal S2 having the first logic state and may electrically connect the second enable signal line Len2 to the ground voltage GND to shift a voltage of the second enable signal line Len2 to the second voltage level based on the ground voltage GND. On the other hand, the second switching element M2 may be turned off according to the second switching control signal S2 having the second logic state and may allow the voltage of the second enable signal line Len2 to be maintained at the first voltage level.

The second switching element M2 according to an aspect may include a gate terminal for receiving the second switching control signal S2, a first source/drain terminal connected to the second enable signal line Len2, and a second source/drain terminal connected to the ground voltage GND. Here, each of the first and second source/drain terminals of the second switching element M2 may be defined as a source terminal or a drain terminal, based on a direction of a current.

The first switching control circuit 250 may be mounted on the PCB adjacent to the first slave power supply circuit 200 and may generate the first switching control signal S1 from the first DC voltage Vout1 output to the output terminal 202 of the first slave power supply circuit 200 to control the turn-on/off of the first switching element M1.

The first switching control circuit 250 according to an aspect may include a comparator which compares a first reference voltage Vref1 with the first DC voltage Vout1 output to the output terminal 202 of the first slave power supply circuit 200 to generate the first switching control signal S1. For example, the first switching control circuit 250 including the comparator may include a non-inverting terminal (+) for receiving the first reference voltage Vref1, an inverting terminal (−) for receiving the first DC voltage Vout1 output to the output terminal 202 of the first slave power supply circuit 200, and an output terminal connected to the gate terminal of the first switching element M1. When the first DC voltage Vout1 is lower than the first reference voltage Vref1, the first switching control circuit 250 may output the first switching control signal S1 having the first logic state for turning on the first switching element M1, and when the first DC voltage Vout1 is equal to or higher than the first reference voltage Vref1, the first switching control circuit 250 may output the first switching control signal S1 having the second logic state for turning off the first switching element M1. As a result, when an incorrect operation or an abnormal output of the first DC voltage Vout1 occurs due to an internal or external cause of the first slave power supply circuit 200, the first switching control circuit 250 may turn on the first switching element M1 to electrically connect the first enable signal line Len1 to the ground voltage GND, thereby shifting the voltage of the first enable signal line Len1 to the second voltage level based on the ground voltage GND. Therefore, as the voltage of the first enable signal line Len1 is shifted to the second voltage level, the master power supply circuit 100 may stop an overall operation of the power supply apparatus, or may shut down the power supply apparatus.

The second switching control circuit 350 may be mounted on the PCB adjacent to the second slave power supply circuit 300 and may generate the second switching control signal S2 from the third DC voltage Vout3 output to the output terminal 302 of the second slave power supply circuit 300 to control the turn-on/off of the second switching element M2.

The second switching control circuit 350 according to an aspect may include a comparator which compares a third reference voltage Vref3 with the third DC voltage Vout3 output to the output terminal 302 of the second slave power supply circuit 300 to generate the second switching control signal S2. For example, the second switching control circuit 350 including the comparator may include a non-inverting terminal (+) for receiving the third reference voltage Vref3, an inverting terminal (−) for receiving the third DC voltage Vout3 output to the output terminal 302 of the second slave power supply circuit 300, and an output terminal connected to the gate terminal of the second switching element M2. When the third DC voltage Vout3 is lower than the third reference voltage Vref3, the second switching control circuit 350 may output the second switching control signal S2 having the first logic state for turning on the second switching element M2, and when the third DC voltage Vout3 is equal to or higher than the third reference voltage Vref3, the second switching control circuit 350 may output the second switching control signal S2 having the second logic state for turning off the second switching element M2. As a result, when an incorrect operation or an abnormal output of the third DC voltage Vout3 occurs due to an internal or external cause of the second slave power supply circuit 300, the second switching control circuit 350 may turn on the second switching element M2 to electrically connect the second enable signal line Len2 to the ground voltage GND, thereby shifting the voltage of the second enable signal line Len2 to the second voltage level based on the ground voltage GND. Therefore, as the voltage of the second enable signal line Len2 is shifted to the second voltage level, the master power supply circuit 100 may stop an overall operation of the power supply apparatus, or may shut down the power supply apparatus.

Figure 2:
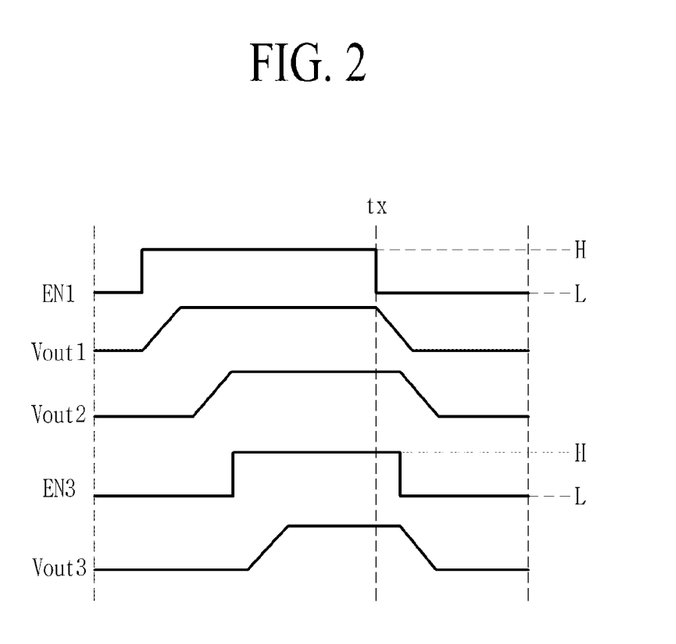
FIG. 2 is a waveform diagram showing an operation of a power supply apparatus according to an aspect of the present disclosure and an operation of a power supply apparatus according to a comparative example.

FIG. 2 is a waveform diagram showing an operation of the power supply apparatus according to an aspect of the present disclosure and an operation of a power supply apparatus according to a comparative example and shows output signals of the first and second control terminals of the master power supply circuit, an output voltage of the first slave power supply circuit, and an output voltage of the second slave power supply circuit.

An operation of the power supply apparatus according to an aspect of the present disclosure will be described with reference to FIG. 2 in conjunction with FIG. 1.

The master power supply circuit 100 may sequentially generate the first enable signal EN1 having a first logic state H, the second enable signal having the first logic state H, and the third enable signal EN3 having the first logic state H, based on a power sequence, supply the first enable signal EN1 having the first logic state H to the first slave power supply circuit 200, and supply the third enable signal EN3 having the first logic state H to the second slave power supply circuit 300.

The first slave power supply circuit 200 may operate based on the first enable signal EN1 having the first logic state H to output the first output voltage Vout1, and the second slave power supply circuit 300 may operate based on the third enable signal EN3 having the first logic state H to output the third output voltage Vout3.

Subsequently, at an arbitrary time tx while the first DC voltage Vout1 and the third DC voltage Vout3 are respectively and normally being output based on an operation of the first slave power supply circuit 200 and an operation of the second slave power supply circuit 300, when the first DC voltage Vout1 is abnormally output due to an incorrect operation of the first slave power supply circuit 200 caused by an internal or external cause of the first slave power supply circuit 200, the first switching control circuit 250 may output the first switching control signal S1 having the first logic state H due to an abnormal voltage level of the first DC voltage Vout1, and thus, the first switching element M1 may be turned on, whereby the voltage of the first enable signal line Len1 may be shifted to a second voltage level GND having a second logic state L. At this time, the first operation sensing circuit 150 of the master power supply circuit 100 may perform an XOR operation on the first enable signal EN1 having the first logic state H supplied to the first buffer circuit 130 and a second voltage level of the first control terminal 103 connected to the first enable signal line Len1 to output the first slave operation signal PG1 having the first logic state H. Therefore, the protection circuit 121 of the master power supply circuit 100 may output the first power cutoff signal PS1 having the first logic state H in response to the first slave operation signal PG1 having the first logic state H, and the power sequence control circuit 123 of the master power supply circuit 100 may shift each of the first to third enable signals EN1 to EN3 to the second logic state (or a low logic state) according to the first power cutoff signal PS1 having the first logic state H, thereby simultaneously or sequentially stopping (or shutting down) operations of the voltage conversion circuit 110, the first slave power supply circuit 200, and the second slave power supply circuit 300.

Likewise, in the power supply apparatus according to an aspect of the present disclosure, even when the third DC voltage Vout3 is abnormally output due to an incorrect operation of the second slave power supply circuit 300, the incorrect operation of the second slave power supply circuit 300 may be sensed according to an operation of each of the second switching control circuit 350 and the second switching element M2 as described above.

In the power supply apparatus according to an aspect of the present disclosure, a power sequence of the plurality of slave power supply apparatuses 200 and 300 may be easily controlled without any increase in number of terminals of the master power supply circuit 100, and particularly, abnormal operations of the slave power supply apparatuses 200 and 300 may be sensed by using the enable signal lines respectively connected to the plurality of slave power supply apparatuses 200 and 300 without additional operation sensing lines for sensing the abnormal operations of the slave power supply apparatuses 200 and 300. Accordingly, the abnormal operations of the slave power supply apparatuses 200 and 300 may be stopped or autonomously shut down.

Figure 3:
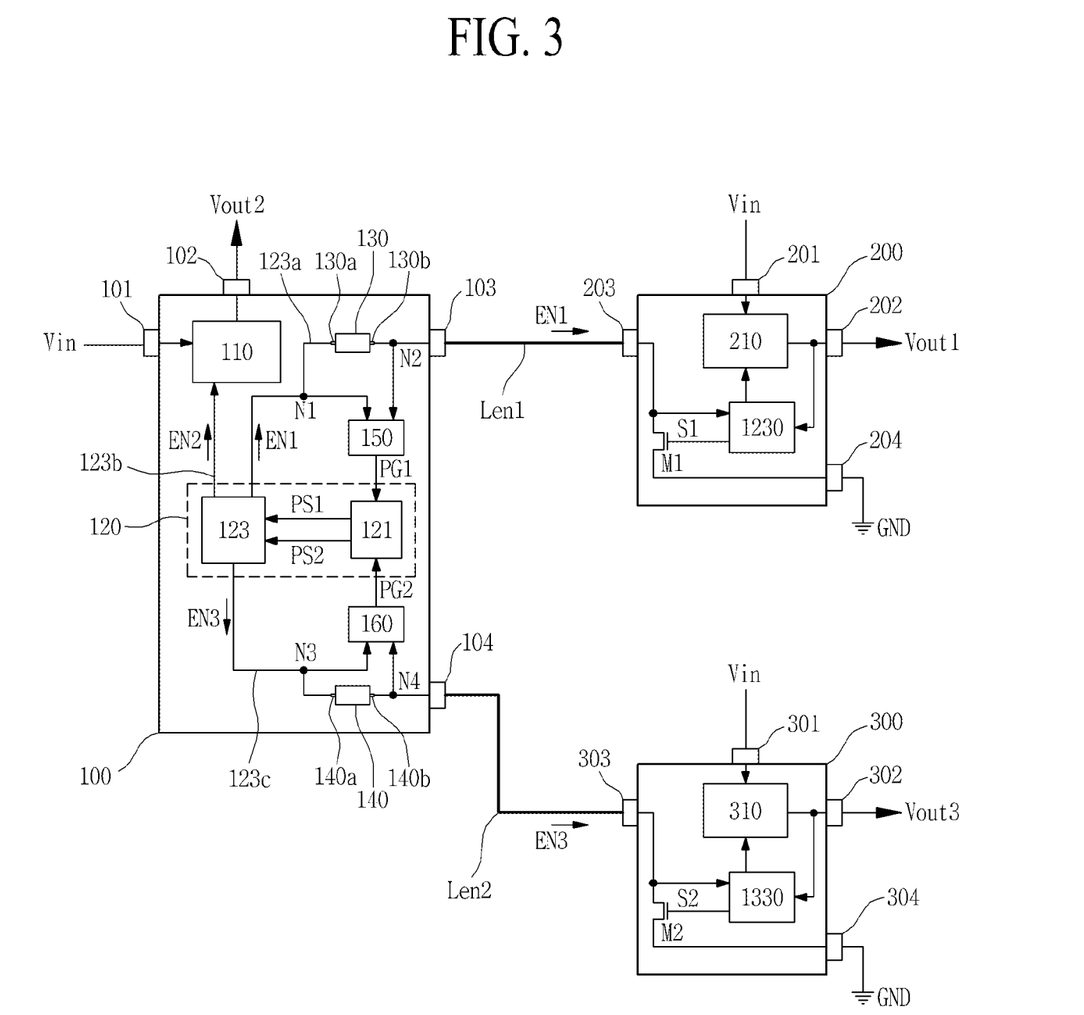
FIG. 3 is a diagram illustrating a power supply apparatus according to another aspect of the present disclosure.

FIG. 3 is a diagram illustrating a power supply apparatus according to another aspect of the present disclosure and illustrates an example where a switching element and a switching control circuit are embedded into a slave power supply apparatus in the power supply apparatus illustrated in FIG. 1.

Referring to FIG. 3, the power supply apparatus according to another aspect of the present disclosure may include a master power supply circuit 100, a first slave power supply circuit 200, a second slave power supply circuit 300, a first enable signal line Len1, and a second enable signal line Len2.

The master power supply circuit 100 may be configured and may operate substantially identical to the master power supply circuit illustrated in FIG. 1, and thus, its repetitive description will be omitted.

The first slave power supply circuit 200 may include a power terminal 201 connected to an input voltage Vin, an output terminal 202 for outputting a first DC voltage Vout1, an enable input terminal 203 for receiving a first enable signal EN1, and a ground terminal 204 connected to a ground voltage GND. Also, the first slave power supply circuit 200 may include a first voltage conversion unit 210, a first switching element M1, and a first control unit 1230.

The first voltage conversion unit 210 may convert the input voltage Vin, input through the power terminal 201, into the first DC voltage Vout1 and may output the first DC voltage Vout1 to the output terminal 202. The first voltage conversion unit 210 according to an aspect may be configured with a DC-DC converter (for example, a buck converter (or a step-down converter) or a boost converter (or a step-up converter), based on a voltage level of the input voltage Vin and a level of the first DC voltage Vout1.

The first switching element M1 may be connected between the enable input terminal 203 and the ground terminal 204 and may be turned on according to a first switching control signal S1. For example, the first switching element M1 may be turned on according to the first switching control signal S1 having a first logic state and may electrically connect the enable input terminal 203 to the ground terminal 204 to shift a voltage of the first enable signal line Len1, connected to the enable input terminal 203, to a second voltage level based on the ground voltage GND. On the other hand, the first switching element M1 may be turned off according to the first switching control signal S1 having a second logic state and may allow the voltage of the first enable signal line Len1 connected to the enable input terminal 203 to be maintained at the first voltage level.

The first control unit 1230 may start (or control) an operation of the first voltage conversion unit 210 according to the first enable signal EN1 having the first logic state which is input through the first enable signal line Len1 and the enable input terminal 203 from the master power supply circuit 100. Also, the first control unit 1230 may receive a voltage level of the first DC voltage Vout1 which is output to the output terminal 202 and is fed back thereto, and may control an operation of the first voltage conversion unit 210, thereby allowing the first voltage conversion unit 210 to output the first DC voltage Vout1 which is constant.

Moreover, the first control unit 1230 may receive the voltage level of the first DC voltage Vout1 which is output to the output terminal 202 and is fed back thereto, and may generate the first switching control signal S1 to control the turn-on of the first switching element M1. For example, when the first DC voltage Vout1 output to the output terminal 202 is lower than a first reference voltage, the first control unit 1230 may output the first switching control signal S1 having the first logic state for turning on the first switching element M1, and when the first DC voltage Vout1 is equal to or higher than the first reference voltage, the first control unit 1230 may output the first switching control signal S1 having the second logic state for turning off the first switching element M1. As a result, when an incorrect operation or an abnormal output of the first DC voltage Vout1 occurs due to an internal or external cause of the first slave power supply circuit 200, the first control unit 1230 may turn on the first switching element M1 to electrically connect the enable input terminal 203 to the ground terminal 204, thereby shifting the voltage of the first enable signal line Len1 connected to the enable input terminal 203 to the second voltage level based on the ground voltage GND. Therefore, as the voltage of the first enable signal line Len1 is shifted to the second voltage level, the master power supply circuit 100 may stop an overall operation of the power supply apparatus, or may shut down the power supply apparatus.

The second slave power supply circuit 300 may include a power terminal 301 connected to the input voltage Vin, an output terminal 302 for outputting a third DC voltage Vout3, an enable input terminal 303 for receiving a third enable signal EN3, and a ground terminal 304 connected to the ground voltage GND. Also, the second slave power supply circuit 300 may include a second voltage conversion unit 310, a second switching element M2, and a second control unit 1330.

The second voltage conversion unit 310 may convert the input voltage Vin, input through the power terminal 301, into the third DC voltage Vout3 and may output the third DC voltage Vout3 to the output terminal 302. The second voltage conversion unit 310 according to an aspect may be configured with a DC-DC converter (for example, a buck converter (or a step-down converter) or a boost converter (or a step-up converter), based on the voltage level of the input voltage Vin and a level of the third DC voltage Vout3.

The second switching element M2 may be connected between the enable input terminal 303 and the ground terminal 304 and may be turned on according to a second switching control signal S2. For example, the second switching element M2 may be turned on according to the second switching control signal S2 having the first logic state and may electrically connect the enable input terminal 303 to the ground terminal 304 to shift a voltage of the second enable signal line Len2, connected to the enable input terminal 303, to the second voltage level based on the ground voltage GND. On the other hand, the second switching element M2 may be turned off according to the second switching control signal S2 having the second logic state and may allow the voltage of the second enable signal line Len2 connected to the enable input terminal 303 to be maintained at the first voltage level.

The second control unit 1330 may start (or control) an operation of the second voltage conversion unit 310 according to the second enable signal EN2 having the first logic state which is input through the second enable signal line Len2 and the enable input terminal 303 from the master power supply circuit 100. Also, the second control unit 1330 may receive a voltage level of the third DC voltage Vout3 which is output to the output terminal 302 and is fed back thereto, and may control an operation of the second voltage conversion unit 310, thereby allowing the second voltage conversion unit 310 to output the third DC voltage Vout3 which is constant.

Moreover, the second control unit 1330 may receive the voltage level of the third DC voltage Vout3 which is output to the output terminal 302 and is fed back thereto, and may generate the second switching control signal S2 to control the turn-on/off of the second switching element M2. For example, when the third DC voltage Vout3 output to the output terminal 302 is lower than a third reference voltage, the second control unit 1330 may output the second switching control signal S2 having the first logic state for turning on the second switching element M2, and when the third DC voltage Vout3 is equal to or higher than the third reference voltage, the second control unit 1330 may output the second switching control signal S2 having the second logic state for turning off the second switching element M2. As a result, when an incorrect operation or an abnormal output of the third DC voltage Vout3 occurs due to an internal or external cause of the second slave power supply circuit 300, the second control unit 1330 may turn on the second switching element M2 to electrically connect the enable input terminal 303 to the ground terminal 304, thereby shifting the voltage of the second enable signal line Len2 connected to the enable input terminal 303 to the second voltage level based on the ground voltage GND. Therefore, as the voltage of the second enable signal line Len2 is shifted to the second voltage level, the master power supply circuit 100 may stop an overall operation of the power supply apparatus, or may shut down the power supply apparatus.

An operation of the power supply apparatus according to another aspect of the present disclosure will be described with reference to FIG. 3 in conjunction with FIG. 2.

The master power supply circuit 100 may sequentially generate the first enable signal EN1 having the first logic state H, the second enable signal having the first logic state H, and the third enable signal EN3 having the first logic state H, based on a power sequence, supply the first enable signal EN1 having the first logic state H to the first slave power supply circuit 200, and supply the third enable signal EN3 having the first logic state H to the second slave power supply circuit 300.

The first slave power supply circuit 200 may operate based on the first enable signal EN1 having the first logic state H to output the first output voltage Vout1, and the second slave power supply circuit 300 may operate based on the third enable signal EN3 having the first logic state H to output the third output voltage Vout3.

Subsequently, at an arbitrary time tx while the first DC voltage Vout1 and the third DC voltage Vout3 are respectively and normally being output based on an operation of the first slave power supply circuit 200 and an operation of the second slave power supply circuit 300, when the first DC voltage Vout1 is abnormally output due to an incorrect operation of the first slave power supply circuit 200 caused by an internal or external cause of the first slave power supply circuit 200, the first control unit 1230 of the first slave power supply circuit 200 may compare an abnormal voltage level of the first DC voltage Vout1 with the first reference voltage Vref1 and output the first switching control signal S1 having the first logic state H according to a result of the comparison to turn on the first switching element M1, and thus, the voltage of the first enable signal line Len1 may be shifted to the second voltage level having the second logic state L. At this time, the first operation sensing circuit 150 of the master power supply circuit 100 may perform an XOR operation on the first enable signal EN1 having the first logic state H supplied to the first buffer circuit 130 and the second voltage level of the second control terminal 104 connected to the first enable signal line Len1 to output the first slave operation signal PG1 having the first logic state H. Therefore, the protection circuit 121 of the master power supply circuit 100 may output the first power cutoff signal PS1 having the first logic state H in response to the first slave operation signal PG1 having the first logic state H, and the power sequence control circuit 123 of the master power supply circuit 100 may shift each of the first to third enable signals EN1 to EN3 to the second logic state (or the low logic state) according to the first power cutoff signal PS1 having the first logic state H, thereby simultaneously or sequentially stopping (or shutting down) operations of the voltage conversion circuit 110, the first slave power supply circuit 200, and the second slave power supply circuit 300.

Likewise, in the power supply apparatus according to an aspect of the present disclosure, even when the third DC voltage Vout3 is abnormally output due to an incorrect operation of the second slave power supply circuit 300, the incorrect operation of the second slave power supply circuit 300 may be sensed according to an operation of the second switching element M2 based on control by the second control unit 1330 as described above.

The power supply apparatus according to another aspect of the present disclosure has the same effect as that of the power supply apparatus according to an aspect of the present disclosure. Also, in the power supply apparatus according to another aspect of the present disclosure, the switching elements M1 and M2 which respectively shift the voltages of the enable signal lines Len1 and Len2 according to abnormal operations of the slave power supply apparatuses 200 and 300 may be respectively embedded into the slave power supply apparatuses 200 and 300, and thus, circuit configuration may be simplified.

FIGS. 1 and 3 illustrate two slave power supply circuits 200 and 300, but the present disclosure is not limited thereto. In other aspects, three or more slave power supply circuits may be connected to one master power supply circuit 100, and even in this case, an incorrect operation of each of the three or more slave power supply circuits may be sensed based on a voltage shift of an enable signal line connected to a corresponding slave power supply circuit of the three or more slave power supply circuits.

The power supply apparatus according to the aspects of the present disclosure may be used as a power supply apparatus for flat panel display apparatuses such as liquid crystal display (LCD) apparatuses, light emitting display apparatuses, micro light emitting display apparatuses, and quantum dot display apparatuses, and moreover, may be applied to various electronic devices such as televisions (TVs), monitors, notebook computers, smartphones, tablet personal computers (PCs), electronic pads, wearable devices, watch phones, portable information devices, navigation devices, and automotive control display apparatuses.

Figure 4:
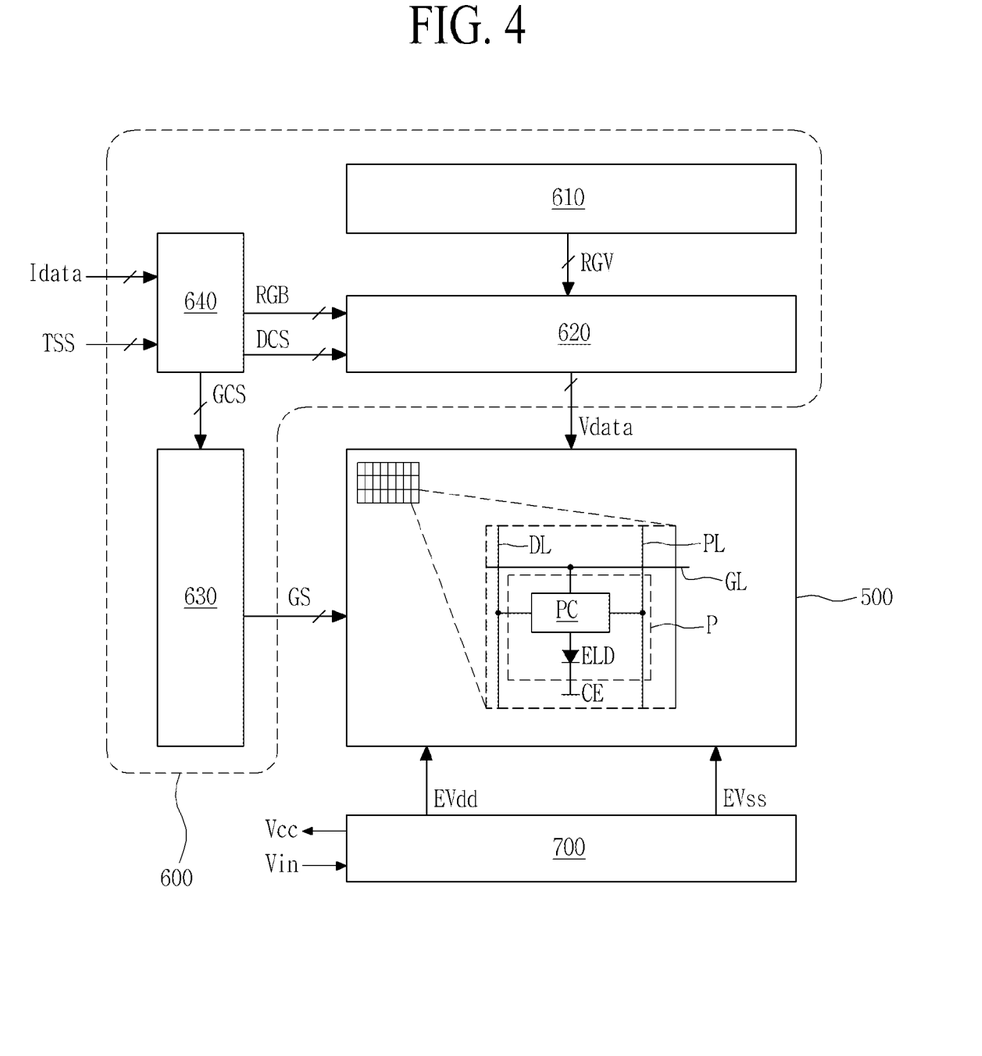
FIG. 4 is a diagram illustrating a display apparatus according to an aspect of the present disclosure.

FIG. 4 is a diagram illustrating a display apparatus according to an aspect of the present disclosure.

Referring to FIG. 4, the display apparatus according to an aspect of the present disclosure may include a display panel 500, a panel driver 600, and a power supply unit 700.

The display panel 500 may include a plurality of pixels P respectively provided in a plurality of pixel areas defined by intersections of a plurality of gate lines GL and a plurality of data lines DL.

The plurality of pixels P may each include a pixel circuit PC and a light emitting device ELD.

The pixel circuit PC may control a current flowing to the light emitting device ELD through a pixel driving power line PL through which a pixel driving voltage EVdd is supplied, based on a data voltage Vdata which is supplied through a data line DL according to a gate signal GS supplied through a gate line GL. For example, the pixel circuit PC may include a driving transistor, which controls the current flowing in the light emitting device ELD, and a capacitor connected between a source electrode and a gate electrode of the driving transistor. Here, the transistor may be a TFT and may be an amorphous silicon (a-Si) TFT, a poly-Si TFT, an oxide TFT, an organic TFT, or the like.

The light emitting device ELD may be disposed between an anode electrode (or a pixel electrode) connected to the source electrode of the driving transistor of the pixel circuit PC and a cathode electrode (or a reflective electrode) CE to which a cathode voltage EVss is supplied. The light emitting device ELD according to an aspect may include an organic light emitting part, a quantum dot light emitting part, or an inorganic light emitting part, or may include a micro light emitting diode. The light emitting device ELD may emit light with the data voltage supplied from the pixel circuit PC.

The panel driver 600 may include a reference gamma voltage supply unit 610, a data driving circuit unit 620, a gate driving circuit unit 630, and a timing controller 640.

The reference gamma voltage supply unit 610 may be implemented with a programmable gamma IC which generates a plurality of different reference gamma voltages RGV. The reference gamma voltage supply unit 610 may perform voltage division between a low level voltage and a high level voltage for generation of reference gamma voltages to generate the plurality of different reference gamma voltages RGV and may supply the plurality of reference gamma voltages RGV to the data driving circuit unit 620.

The data driving circuit unit 620 may subdivide the plurality of reference gamma voltages RGV supplied from the reference gamma voltage supply unit 610 to generate a plurality of grayscale voltages, latch pixel data RGB input from the timing controller 640 according to a data control signal DCS supplied from the timing controller 640, convert latched data into data voltages Vdata by using the plurality of grayscale voltages, and supply the data voltages Vdata to corresponding data lines DL.

The gate driving circuit unit 630 may generate the gate signal GS according to a gate control signal GCS supplied from the timing controller 640 and may supply the gate signal GS to a corresponding gate line GL. Here, the gate driving circuit unit 630 may be directly formed in a non-display area of the display panel 500 through a process of manufacturing TFTs.

The timing controller 640 may align input data Idata input from the outside to generate the pixel data RGB matching a pixel arrangement structure of the display panel 500 and may supply the pixel data RGB to the data driving circuit unit 620. Also, the timing controller 640 may generate the data control signal DCS for controlling an operation timing of the data driving circuit unit 620 and the gate control signal GCS for controlling an operation timing of the gate driving circuit unit 630, based on a timing synchronization signal TSS input thereto.

The power supply unit 700 may generate and output a voltage needed for driving of the display apparatus. That is, the power supply unit 700 may generate and output various voltages needed for displaying an image on the display panel 500, and for example, the various voltages may include pixel driving voltages such as a ground voltage and a logic voltage Vcc for operations of circuits configuring the panel driver 600, a gate-on voltage for turning on TFTs, a gate-off voltage for turning off the TFTs, and the pixel driving voltage EVdd and the cathode voltage EVss supplied to each of the plurality of pixels P.

The power supply unit 700 according to an aspect may include a voltage supply apparatus, and the voltage supply apparatus may be configured with the power supply apparatus according to an aspect or another aspect of the present disclosure described above with reference to FIGS. 1 to 3. Thus, its repetitive description is omitted.

The display apparatus according to an aspect of the present disclosure may include the power supply apparatus according to the present disclosure. Therefore, the display apparatus may be supplied with a DC voltage based on a power sequence to operate, and when an abnormal operation of the power supply apparatus occurs, the display apparatus may be shut down without performing an incorrect operation.

As described above, in the aspects of the present disclosure, a power sequence of a plurality of slave power supply apparatuses may be easily controlled without any increase in number of terminals of a master power supply circuit, and abnormal operations of the slave power supply apparatuses may be sensed by using the enable signal lines respectively connected to the plurality of slave power supply apparatuses without an additional operation sensing line.

Moreover, in the aspects of the present disclosure, a circuit configuration of the power supply apparatus is simplified.

The above-described feature, structure, and effect of the present disclosure are included in at least one aspect of the present disclosure, but are not limited to only one aspect. Furthermore, the feature, structure, and effect described in at least one aspect of the present disclosure may be implemented through combination or modification of other aspects by those skilled in the art. Therefore, content associated with the combination and modification should be construed as being within the scope of the present disclosure.

It will be apparent to those skilled in the art that various modifications and variations can be made in the present disclosure without departing from the spirit or scope of the disclosures. Thus, it is intended that the present disclosure covers the modifications and variations of this disclosure provided they come within the scope of the appended claims and their equivalents.

What is claimed is:

1. A power supply apparatus comprising:
    a master power supply circuit;
    a slave power supply circuits; and
    an enable signal line connected between the master power supply circuit and the lave power supply circuit,
    wherein a voltage of the enable signal line is shifted based on an operation of the slave power supply circuit, and
    wherein the master power supply circuit includes:
    a power terminal connected to an input voltage;
    an output terminal outputting another direct current (DC) voltage; and
    a control terminal connected to the enable signal line.

2. The power supply apparatus of claim 1, wherein the voltage of the enable signal line is maintained at a first voltage level according to an enable signal supplied from the master power supply circuit, or is shifted to a second voltage level which differs from the first voltage level when the slave power supply circuit fails to function normally.

3. The power supply apparatus of claim 2, wherein the slave power supply circuit includes:
    a power terminal connected to an input voltage;
    an enable input terminal connected to the enable signal line;
    a ground terminal connected to a ground voltage; and
    an output terminal outputting a direct current (DC) voltage, and
    wherein the voltage of the enable signal line is maintained at the first voltage level or is shifted to the second voltage level, based on a voltage level of the output terminal.

4. The power supply apparatus of claim 3, wherein the slave power supply circuit further includes:
    a voltage conversion unit converting the input voltage, input through the power terminal, into the DC voltage and outputting the DC voltage to the output terminal;
    a switching element connected between the enable input terminal and the ground terminal; and
    a control unit controlling the voltage conversion unit according to the enable signal and generating a switching control signal from the DC voltage output to the output terminal to control turn-on/off of the switching element.

5. The power supply apparatus of claim 4, wherein the control unit compares a reference voltage with the DC voltage output to the output terminal to generate the switching control signal.

6. The power supply apparatus of claim 3, further comprising:
    a switching element connected between the enable signal line and the ground voltage; and
    a switching control circuit generating a switching control signal from the DC voltage output through the output terminal of the slave power supply circuit to control turn-on/off of the switching element.

7. The power supply apparatus of claim 6, wherein the switching control circuit comprises a comparator comparing a reference voltage with the DC voltage output through the output terminal of the slave power supply circuit to generate the switching control signal.

8. The power supply apparatus of claim 1, wherein the master power supply circuit further includes:
    a master control circuit generating the enable signal, based on a predetermined power sequence and outputting the enable signal to the control terminal;
    a buffer circuit connected between the master control circuit and the control terminal; and
    a comparison circuit comparing a voltage of the control terminal with the enable signal supplied to the buffer circuit to generate a slave operation signal,
    wherein the master control circuit shifts the enable signal according to the slave operation signal.

9. The power supply apparatus of claim 8, wherein the buffer circuit includes an even number of inverters connected serially between the master control circuit and the control terminal.

10. The power supply apparatus of claim 8, wherein the master control circuit further includes:
a protection circuit generating a power cutoff signal, based on the slave operation signal supplied from the comparison circuit; and
a power sequence control circuit generating the enable signal and outputting the enable signal to the control terminal through the buffer circuit, wherein the power sequence control circuit varies the enable signal according to the power cutoff signal.

11. A display apparatus comprising:
a display panel including a pixel provided in a pixel area defined by intersection of a gate line and a data line;
a panel driver supplying a gate signal to the gate line and supplying a data voltage to the data line; and
a power supply unit converting an input voltage into a direct current (DC) voltage and supplying the DC voltage to at least one of the display panel and the panel driver,
wherein the power supply unit includes a master power supply circuit, a slave power supply circuit; and an enable signal line connected between the master power supply circuit and the slave power supply circuit,
wherein a voltage of the enable signal line is shifted based on an operation of the slave power supply circuit, and
wherein the master power supply circuit of the power supply apparatus includes:
a power terminal connected to an input voltage;
an output terminal outputting another direct current (DC) voltage; and
a control terminal connected to the enable signal line.

12. The display apparatus of claim 11, wherein the master power supply circuit further includes:
a master control circuit generating the enable signal, based on a predetermined power sequence and outputting the enable signal to the control terminal;
a buffer circuit connected between the master control circuit and the control terminal; and
a comparison circuit comparing a voltage of the control terminal with the enable signal supplied to the buffer circuit to generate a slave operation signal,
wherein the master control circuit shifts the enable signal according to the slave operation signal.

13. The display apparatus of claim 12, wherein the buffer circuit includes an even number of inverters connected serially between the master control circuit and the control terminal.

14. The display apparatus of claim 12, wherein the master control circuit further includes:
a protection circuit generating a power cutoff signal, based on the slave operation signal supplied from the comparison circuit; and
a power sequence control circuit generating the enable signal and outputting the enable signal to the control terminal through the buffer circuit, wherein the power sequence control circuit varies the enable signal according to the power cutoff signal.

15. A power supply apparatus comprising:
a master power supply circuit functioning as a main power supply;
a slave power supply circuit functioning as an auxiliary power supply to the master power supply circuit and operated under control of the master power supply circuit; and
an enable signal line connected between the master power supply circuit and the slave power supply circuit, and transmitting a voltage shifted based on an operation of the slave power supply circuit, and
wherein the master power supply circuit includes:
a power terminal connected to an input voltage;
an output terminal outputting another direct current (DC) voltage; and
a control terminal connected to the enable signal line.

16. The power supply apparatus of claim 15, wherein the voltage of the enable signal line is maintained at a first voltage level according to an enable signal supplied from the master power supply circuit, or is shifted to a second voltage level which differs from the first voltage level when the slave power supply circuit fails to function normally.

17. The power supply apparatus of claim 16, wherein the slave power supply circuit includes:
a power terminal connected to an input voltage;
an enable input terminal connected to the enable signal line;
a ground terminal connected to a ground voltage; and
an output terminal outputting a direct current (DC) voltage, and
wherein the voltage of the enable signal line is maintained at the first voltage level or is shifted to the second voltage level, based on a voltage level of the output terminal.

18. The power supply apparatus of claim 17, wherein the slave power supply circuit includes:
a voltage conversion unit converting the input voltage, input through the power terminal, into the DC voltage and outputting the DC voltage to the output terminal;
a switching element connected between the enable input terminal and the ground terminal; and
a control unit controlling the voltage conversion unit according to the enable signal and generating a switching control signal from the DC voltage output to the output terminal to control turn-on/off of the switching element.

* * * * *